United States Patent [19]

Wailes

[11] Patent Number: 4,753,408
[45] Date of Patent: Jun. 28, 1988

[54] ADJUSTABLE ATTITUDE SPEAKER STAND

[75] Inventor: Jaci Wailes, Huntington Beach, Calif.

[73] Assignee: David Warren, Huntington Beach, Calif. ; a part interest

[21] Appl. No.: 39,161

[22] Filed: Apr. 16, 1987

[51] Int. Cl.$^4$ ............................................... A47G 29/00
[52] U.S. Cl. .................................... 248/371; 108/145; 248/161
[58] Field of Search ............... 248/371, 370, 393, 395, 248/405, 172, 173, 133, 139, 454, 161, 424; 108/145

[56] References Cited

U.S. PATENT DOCUMENTS

| | | |
|---|---|---|
| 512,471 | 1/1894 | Holt . |
| 1,563,469 | 12/1925 | Chamberlin . |
| 2,248,369 | 7/1941 | Ludersen .............................. 248/371 |
| 2,275,610 | 3/1942 | Bucky et al. ............................ 250/6 |
| 2,664,258 | 12/1953 | Lanier ................... 248/172 |
| 3,095,666 | 7/1968 | Killen .................... 45/129 |
| 3,226,077 | 12/1965 | Killen .................... 248/448 |
| 3,408,032 | 10/1968 | Francis ......................... 248/454 X |
| 3,799,488 | 3/1974 | Sena ..................... 248/441 |
| 3,955,511 | 5/1976 | Bak ....................... 108/137 |
| 4,116,413 | 9/1978 | Anderson ...................... 248/242 |
| 4,260,124 | 4/1981 | Heilman .......................... 248/448 |

Primary Examiner—Ramon O. Ramirez
Attorney, Agent, or Firm—Fulwider, Patton, Rieber, Lee & Utecht

[57] ABSTRACT

An adjustable attitude speaker stand including a base in the form of a pair of laterally spaced apart elongated rails having longitudinal slots formed therein. A pair of posts rise upwardly from the slots and are coupled thereto by followers for forward and rearward movement relative thereto. The upper extremities of the post are also formed with generally vertically extending slots and braces are pivotally connected to the rear extremities of the rails and include followers coupled with such post slots such that the posts may be adjusted forwardly and rearwardly at both their top and bottom ends. A pair of support arms project cantileverly forwardly from the lower portion of the post for receiving and cradling a load speaker such that adjustment of the posts will vary the attitude of such arms to direct sound from the speaker at selected angles from a range projecting generally horizontally across the room to a upward angle of about 45°. In another embodiment the frame is of tubular construction and is formed to define an L-shaped side view, the opposite sides being carried by sliders received in semi-circular slots formed in vertically raised side rails such that travel of such sliders in the slots effects angular adjustment of the frame.

13 Claims, 1 Drawing Sheet

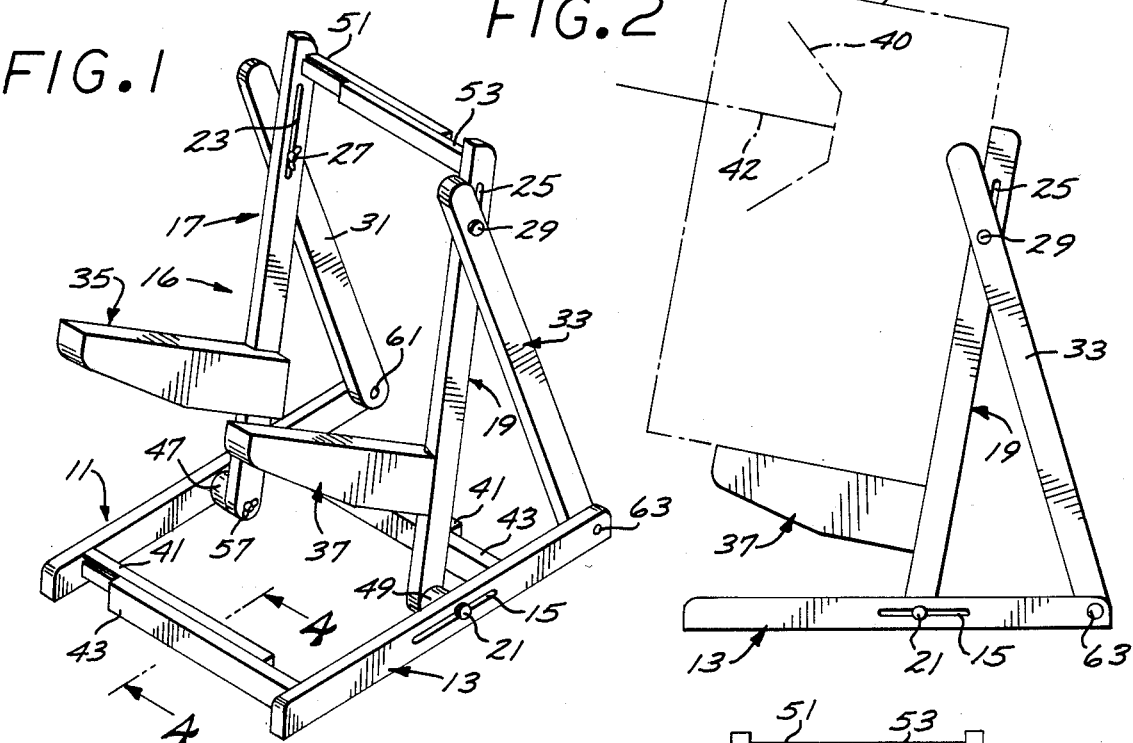

4,753,408

ADJUSTABLE ATTITUDE SPEAKER STAND

BACKGROUND OF THE INVENTION

1. Field Of The Invention

The present invention relates to a stand for holding speakers such as high fidelity speakers.

2. Description Of The Prior Art

It has been discovered that the quality of music propagated into a room from hifi speakers may be improved tremendously by arranging and orienting the speakers within the room in accordance with the size and the configuration of the room, furnishings in the room and number of people occupying the room. It has been discovered that the quality of music may be improved considerably by merely varying the direction of the sound propagated from such speakers through a range directed approximately horizontally from the periphery of the room toward the center thereof to an angle 10° to 15° above the horizontal and even in extreme occasions as much as 45° above the horizontal.

Since hifi speakers are housed in housings having numerous different sizes, shapes and configurations, heretofore there has been no reasonably acceptable support which would accommodate the wide variation of speakers. Some listeners have gone so far as to resort to propping speakers at various attitudes by inserting ashtrays, books or other spacers under the forward edge of the speaker to aim the speaker generally upwardly.

It has been discovered that elevating the center of the loud speakers to an elevation of about two feet off the floor and directing the sound upwardly and outwardly from that location also serves to enhance quality. Generally, furnishings and supports currently available do not provide for convenient support of speakers at this optimum elevation while accommodating ready adjustment of the attitude of such speakers so that adjustment can conveniently made by even the most unskilled operator. While adjustable easels and other stands of various natures have been proposed for numerous different applications, applicant is unaware of any adjustable stands which have been proposed for supporting a speaker at a low elevation and readily adjustable to vary the orientation of the speaker or which would readily adjust to accommodate speakers of numerous different widths.

SUMMARY OF THE INVENTION

The present invention is characterized by a base including a pair of side rails formed with forwardly and rearwardly extending coupling slots which receive followers that serve to mount a cradle carried from such rail. The cradle forms a bottom support and back support for a speaker and is mounted on the side rails in such a manner as to provide for convenient and ready adjustment of the attitude thereof to support a speaker at a number of different attitudes for propagating sound therefrom at different angles.

Other objects and features of the invention will become apparent from consideration of the following description taken in connection with the accompanying drawing.

BRIEF DESCRIPTION OF THE DRAWINGS

FIG. 1 is a perspective view of an adjustable attitude speaker stand of the present invention;

FIG. 2 is a side view of the speaker stand shown in FIG. 1;

FIG. 3 is a top view of the speaker stand shown in FIG. 1;

FIG. 4 is a transverse section view, in enlarged scale, taken along the line 4—4 of FIG. 1;

FIG. 5 is a perspective view of a second embodiment of the adjustable speaker stand of the present invention; and FIG. 6 is a righthand view, in enlarged scale, of the speaker stand shown in FIG. 5.

DESCRIPTION OF THE PREFERRED EMBODIMENTS

Referring to FIGS. 1 and 2, the adjustable attitude speaker stand of the present invention includes, generally, a base formed by a pair of forwardly and rearwardly projecting, laterally spaced apart side rails 11 and 13 formed medially with forwardly and rearwardly projecting coupling slots 15. A cradle 16 includes vertical posts 17 and 19 connected to such slots 15 by means of followers 21 and rise upwardly therefrom to form at the top extremities respective vertically extending coupling slots 23 and 25 which receive respective followers 27 and 29 carried from the upper extremities of respective braces 31 and 33. The bottom extremities of such braces are pivotally connected with the rear extremity of the rails 11 and 13. Supported medially on the posts 17 and 19 are forwardly and upwardly projecting support arms 35 and 37 on which a speaker 39 may be mounted. Consequently, the attitude of such speaker may be readily adjusted by merely adjusting the attitude of the posts 17 and 19 and, consequently, the attitude of the arms 35 and 37.

Speaker housings are typically rectangular in elevation and top plan view and mount a forwardly facing loudspeaker 40 in the upper portion thereof to project sound in a divergent manner about an extended axis 42 of such loudspeaker.

The adjustable attitude stand of the present invention may be constructed of any convenient material, such as wood or plastic. The base rails 11 and 13 are connected together by means of two pairs of forwardly and rearwardly disposed cross bars 41 and 43. The cross bars 41 are connected on their respective one ends to the respective side rails 41 and 43 and project perpendicularly therefrom to be coupled slidably together on their proximate ends. Referring to FIG. 4, the rails 43 are conveniently formed with dove tailed grooves 45 which slidingly receive dove tailed tongues 47 in the respective rails 41.

Likewise, the upper ends of the posts 17 and 19 are connected together by similar rails 51 and 53 which are themselves coupled slidably together by means of dove tailed tongues and grooves to telescope relative to one another.

The vertical posts 17 and 19 are approximately two feet long. Tubular spacers 47 and 49 are interposed between the bottom ends of such posts and the respective rails 11 and 13. The followers 21 are in the form of threaded bolts which receive wing nuts 57 on the inner extremities thereof such that the followers may be conveniently tightened to restrict travel in the respective grooves 15.

The support arms 35 and 37 are connected medially from the post 17 and 19 at a location to place the top surfaces thereof as they intersect such posts about six inches off the floor. Such arms project perpendicular to the posts themselves.

The bottom ends of braces 31 and 33 are pivotally connected to the back ends of the respective rails 11 and 13 by means of pivot pins 61 and 63. The followers 27 and 29 connect the upper extremities of such braces to the respective post slots 23 and 25 at a location about six inches from the upper ends of such posts such that the braces will project forwardly of the post as viewed in FIG. 2 to add to the aesthetic appearance of the stand and also hold the speaker 39 captive therebetween. The followers 27 and 29 ar also in the form of threaded bolts and receive wing nuts 57 on the interior ends thereof for convenient tightening and adjustment.

In operation the stand may be easily assembled and erected by the homeowner. The width of the stand will be easily adjusted to accommodate the width of the speaker 39 by merely sliding the cross members 41 and 43 and 51 and 53 relative to one another to achieve the desired spacing between the arms 35 and 37 and upper extremity of the braces 31 and 33.

It will be appreciated that multiple speakers comparable to speaker 39 are typically located about a room in which music is to be played. The speaker housings will be supported on the arms 35 and 37 in an elevated position which will typically place the loudspeaker (not shown) about 18 inches above the floor. Music projected from this level has proven to have a high quality than would be the case for music projected from a louspeaker elevated only about a foot above the floor.

The attitude of the speakers 39 will be adjusted for the particular configuration of the room, as well as the arrangement of furniture and number of persons occupying the room. This can best be achieved by trial and error experimentation.

It has been found that as a greater number of people gather in a single room, the speaker will be adjusted to direct sound therefrom at a higher angle. For a lesser number of people, the orientation of the speaker will be adjusted to direct sound therefrom at an angle approximating the horizontal. As noted, these angles will vary with the configuration of the room and arrangement of the furniture and can best be achieved by experimentation.

In any event, the wing nuts 57 may conveniently be loosened and the bottom of the posts moved forwardly or rearwardly and the upper portions thereof likewise moved forwardly and rearwardly until the desired orientation attitude of the speaker 39 is achieved.

Referring to the second embodiment of the adjustable speaker stand of the present invention shown in FIGS. 5 and 6, the stand may incorporate side rails which are in the form of semicircular vertical walls, generally designated 81 and 83, having their diametrical sides parallel with the floor. These side walls are preferably formed adjacent their circumferential periphery with forwardly and rearwardly disposed slot sections 85, 87, 89 and 91. The slot sections are preferably in the form of sectors of a circle having a diameter slightly less than that of the circle of which such side walls are a sector.

The cradle, generally designated 95, shown in FIG. 5 is preferably constructed of hollow metal tubing. The tubing is formed with side runs 101 and 103 which turn inwardly at their front extremities to form front sections 105 and 107 connected together at their proximate ends by means of a threaded coupling 109. The side members 101 and 103 are bent upwardly at their rear extremities to form generally vertical posts 111 and 113. The tubes are bent inwardly at the tops of the posts to form run sections 115 and 119, also connected together on their proximate ends by means of threaded couplings 121.

Followers 125, 127, 129 and 131 project through the respective slots 85, 87, 89 and 91 and project through corrresponding bores formed in the side runs and vertical posts of the cradle 95. Thus, by loosening the wing nuts 125 and 127 on such followers and rotating the cradle in a direction which will shift the followers forwardly or rearwardly in the respective slots 85, 87, 89 and 91, the orientation of such cradle will be adjusted to aim the speaker to a greater degree downwardly or upwardly, respectively.

From the foregoing it will be appreciated that the adjustable speaker stand of the present invention provides an economical and effective means for supporting a hifi speaker slightly off the floor and enables convenient adjustment of the orientation thereof depending on the room configuration and configuration of the furniture and number of persons occupying the room.

Various modifications and changes may be made with regard to the foregoing detailed description without departing from the spirit of the invention.

I claim:

1. An adjustable attitude speaker stand for supporting a speaker housing including a bottom wall, and mounting a speaker spaced a predetermined distance from and oriented in said housing to direct sound therefrom in a predetermined direction relative to said bottom wall and comprising:

a base for setting on the floor and including a pair of laterally spaced apart side rails;

a cradle including forwardly projecting support arms formed with upwardly facing bottom support surfaces for receipt of said bottom wall and a forwardly facing back support for receiving the back wall of said speaker housing;

coupling means for coupling said cradle and stand together, said coupling means being characterized in that it is configured to enable the orientation of said cradle to be adjusted through an angular range relative to said base to cause said speaker to, with said bottom wall sitting on said bottom support surface, direct sound emitting therefrom in a direction varying in range of attitudes between the horizontal and a direction directed upwardly and forwardly at substantially 45° to the horizontal; and holding means for selectively holding said cradle in selected positions in said range of attitudes whereby such speaker housing may be nested in said cradle and the attitude of said cradle adjusted relative to said side rails to correspondingly adjust the attitude of said speaker.

2. An adjustable attitude speaker stand as set forth in claim 1 wherein:

said coupling means include slots formed in said side rails and followers mounted from said cradle and received in said slots.

3. An adjustable attitude speaker stand as set forth in claim 1 wherein:

said rails are in the form of elongated slats for resting on the floor in spaced apart parallel arrangement and said base further includes cross members connecting said rails together;

said cradle includes a pair of posts having their respective lower extremities disposed adjacent the medial portions of said rails, said posts rising upwardly and rearwardly to form said back support, said cradle further including elongated arms affixed on their rear extremities to the respective posts and angling upwardly and forwardly to form said support arms; and said coupling means include respective elongated slots in said rails and followers carried from said bottom extremities of said posts and slidably received in said elongated slots.

4. An adjustable attitude speaker stand as set forth in claim 1 wherein:

said bottom support surface is spaced substantially six inches above the bottom sides of said rails.

5. An adjustable attitude speaker stand as set forth in claim 3 wherein:

said cross members are formed in two sections and include telescopical means connecting said two sections together to enable said two sections to be telescoped with respect to one another to adjust the width of said base.

6. An adjustable attitude speaker stand as set forth in claim 3 wherein:

said coupling means includes elongated post slots formed in their upper portions of said posts and a pair of braces pivotally connected on their lower extremities to the rear extremities of said rails and including brace followers on their upper extremities received slidably in said post slots.

7. An adjustable attitude speaker stand as set forth in claim 6 wherein:

said braces are arranged and configured to project forwardly beyond said brace followers to form respective extensions disposed on the opposite sides of said cradle to hold such speaker housing captive therebetween.

8. An adjustable attitude speaker stand as set forth in claim 5 wherein:

said cross members are formed in two sections and include telescopical means connecting said two sections together to enable said two sections to be telescoped with respect to one another to adjust the width of said cradle.

9. An adjustable attitude speaker stand as set forth in claim 1 wherein:

said rails are in the form of planer vertical side walls disposed on opposite sides of said cradle;

said cradle includes a tubular frame formed with forwardly and rearwardly projecting, laterally spaced apart side runs defining said arms, said frame being turned inwardly at the front of said side runs to form a front run connecting said side runs together, said frame being further formed at the rearward ends of said side runs with respective upstanding side posts which turn inwardly at their upper ends to cooperate in forming a top run cooperating with said posts to form said back support; and said coupling means includes opposed forward and rearward slot sections formed in said side walls adjacent said respective side runs and posts, said forward side slots angling upwardly and rearwardly and said rearward side slots angling downwardly and rearwardly, said coupling means further including a pair of followers connected to said respective side runs and received slidably in said forward slot and a pair of followers connected to said posts and received slidably in said rearward slots.

10. An adjustable attitude speaker stand as set forth in claim 9 wherein:

said slots sections are semicircular and formed as sectors of the same circle.

11. An adjustable attitude speaker stand as set forth in claim 9 wherein:

said front and top runs are each constructed of two sections and include threaded coupling means coupling said sections together whereby said frame may be disassembled.

12. An adjustable attitude speaker stand as set forth in claim 9 wherein:

said side rails are semicircular to form a flat downwardly facing side.

13. An adjustable attitude speaker stand as set forth in claim 10 wherein:

said front and top runs are each constructed of two sections and include threaded coupling means coupling said sections together whereby said frame may be disassembled.

* * * * *